United States Patent Office 2,707,194
Patented Apr. 26, 1955

2,707,194

MANDELIC ACID ESTERS OF N-OCTANOL-1 AND N-NONANOL-1

Wijbe Thomas Nauta, Amsterdam, Netherlands, assignor to N. V. Koninklijke Pharmaceutische Fabrieken Voorheen Brocades-Stheeman & Pharmacia, Amsterdam, Netherlands, a company of the Netherlands No Drawing. Application March 8, 1954,
Serial No. 414,882

Claims priority, application Netherlands June 7, 1949

3 Claims. (Cl. 260—473)

This application is a continuation-in-part of my application Ser. No. 166,295, filed June 5, 1950 (now abandoned).

Papaverine, i. e. 1-(3',4'-dimethoxybenzyl) 6,7-dimethoxy iso-quinoline, has been in use for a considerable time as a spasmolytic. A great many attempts have been made to find other spasmolytics; a summary was published by Blicke in Annual Review of Biochemistry, 13, 549–574 (1944). From this it is clear that besides amines and amides the substances attracting special attention were esters, among them esters of di-substituted acetic acids. These esters invariably contain basic nitrogen in the alcohol component. It has also been described in the literature that the piperidinoethanol ester of di-n-butyl acetic acid is an excellent spasmolytic.

It has now been found that the n-octanol-1 and the n-nonanol-1 esters of mandelic acid exhibit a spasmolytic activity which is significantly surpassing that of papaverine. A great advantage consists further in that the toxicity of the said compounds is small as compared with that of papaverine. Thus the $LD_{50}$ for papaverine is 150 mg. and that of the n-octanol-1 and n-nonanol-1 ester of mandelic acid of the order of magnitude of some grams, both per kg. mouse and administered subcutaneously.

The esters described above are novel compounds.

It appears to make little difference whether the laevo- or dextro-rotatory form of mandelic acid was used or dl-mandelic acid.

Several esters of mandelic acid were already known per se, they are the methyl, ethyl, propyl, iso-butyl, 2-methyl, butyl, n-hexyl, benzyl, menthyl and bornyl esters. I had these esters tested and found that as to their spasmolytic activity they are significantly inferior to that of the n-octanol-1 and the n-nonanol-1 esters, as follows from the table below:

| Alcohol component | Mandelic acid | B. P. or M. P. of the ester | Antagonistic to spasms provoked in the isolated Guinea pig intestine by acetyl choline; calculated per grammol |
|---|---|---|---|
| n-octanol-1 | dl | 200° C./18 mm | 130 |
| n-nonanol-1 | dl | 188° C./5 mm | 190 |
| methanol | dl | 57° C.;137° C./16 mm. | 0.3 |
| ethanol | dl | 33–34° C.; 138–141/14 mm. | 0.7 |
| propanol-1 | dl | 150° C./21 mm | 2.4 |
| butanol-2 | dl | 141–142° C./12 mm | 4.5 |
| 2-methyl butanol-1 | dl | 165° C./20 mm | 25 |
| benzylacohol | dl | 90–91° C | 22 |
| 1-menthylalcohol | dl | 81–82° C | <50 |
| 1-bornylalcohol | dl | 78° C | (¹) |
| papaverine | dl | | 27 |

¹ Intestine damaged by the ester; this ester is not so much a spasmolytic, but more a paralyzing drug, so that it cannot be used in practice as a spasmolytic. Accordingly, the measurement of its spasmolytic activity is not accurate; at all events it is considerably less than that of the 3.3.5-trimethylcyclohexanol-1 ester.

The activity of the 3,3,5-trimethyl cyclohexanol-1 ester has been put at 100.

The following are examples of the production of the esters claimed by means of esterification:

Example 1

A mixture of ½ mol mandelic acid, 1½ mol of n-octanol-1, 150 cm.³ of 1,2-dichloroethane and 7.5 cm.³ of concentrated sulphuric acid is refluxed for 5 hours. The solution obtained after being cooled to room temperature is washed with a saturated solution of sodiumbicarbonate and thereafter with distilled water until neutral reaction. The remaining dichloroethane-solution is dried with anhydrous sodium sulphate. The dichloroethane and the excess on n-octanol-1 are distilled off, leaving the n-octanol-1 ester of mandelic acid. The ester is purified by distillation at 200° C./18 mm. Yield: 53% ester calculated on the mandelic acid.

Example 2

For the preparation of the n-nonanol-1 ester of mandelic acid one proceeds exactly in the same way as described in Example 1 for the n-octanol-1 ester. The n-nonanol-1 ester is purified by distillation at 214–217° C./17 mm. Yield: 61% ester calculated on the mandelic acid.

What I claim is:
1. A mandelic acid ester of an alcohol of the group consisting of n-octanol-1 and n-nonanol-1.
2. A mandelic acid ester of n-octanol-1.
3. A mandelic acid ester of n-nonanol-1.

(No references cited.)